Oct. 8, 1935.  W. F. NEUHAUS  2,016,789
EGG WEIGHER
Original Filed April 18, 1932   3 Sheets-Sheet 2
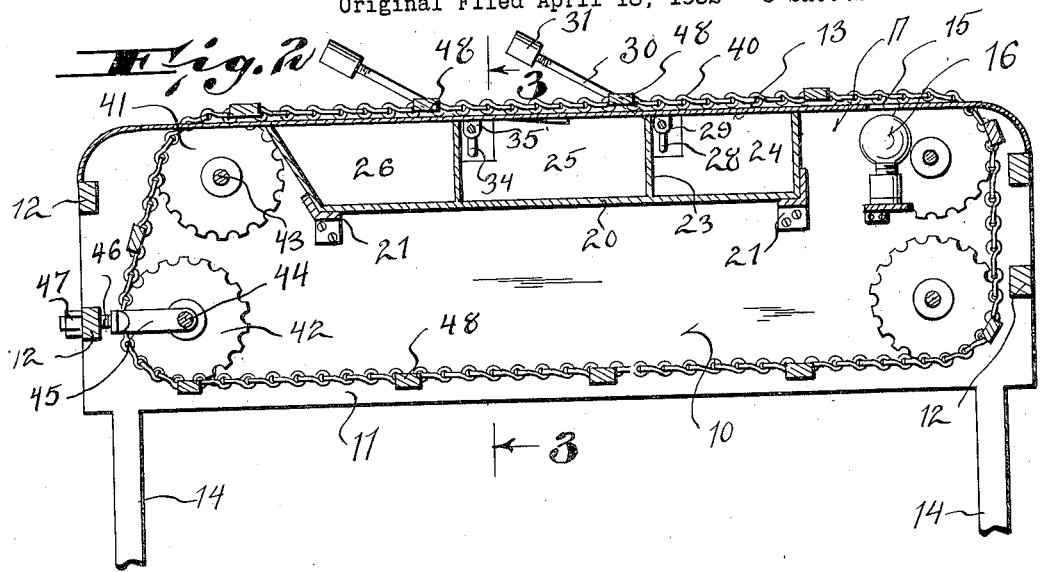
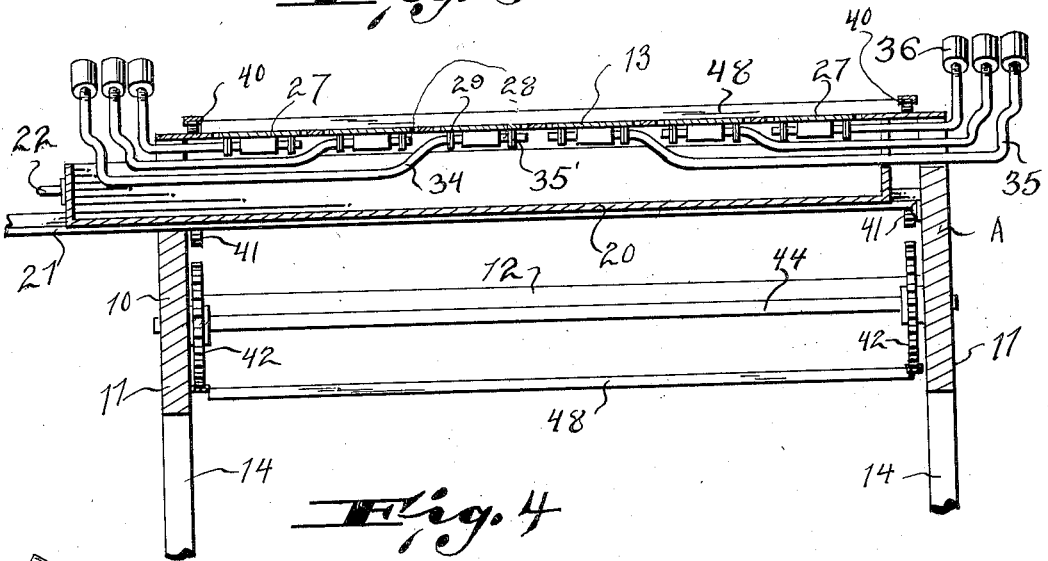
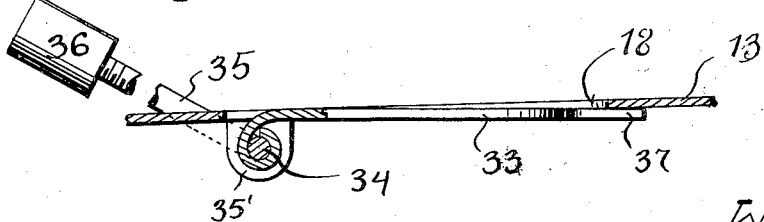
Inventor
W. F. Neuhaus
By *[signature]*
Attorneys Oct. 8, 1935.   W. F. NEUHAUS   2,016,789
EGG WEIGHER
Original Filed April 18, 1932   3 Sheets-Sheet 3
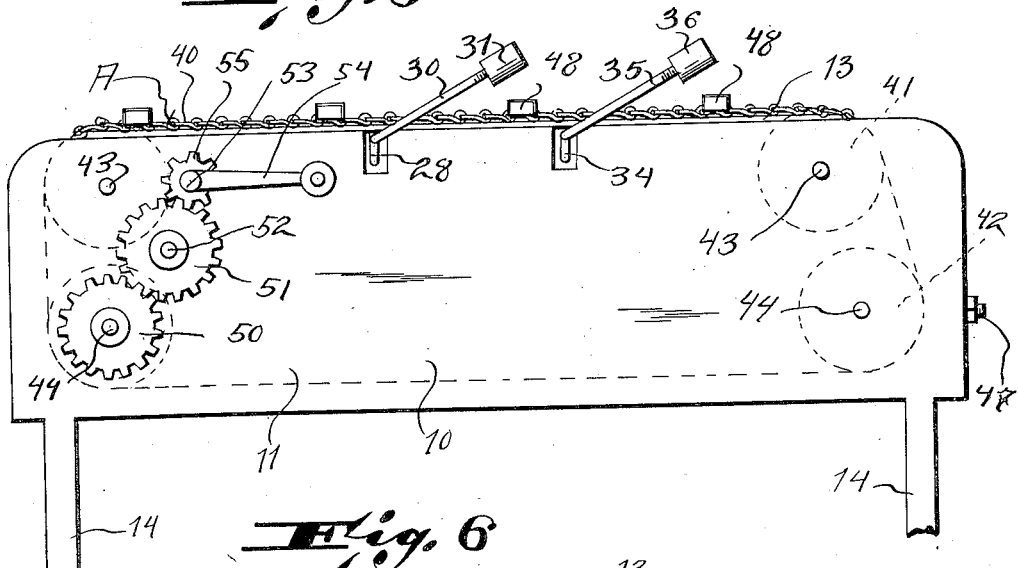
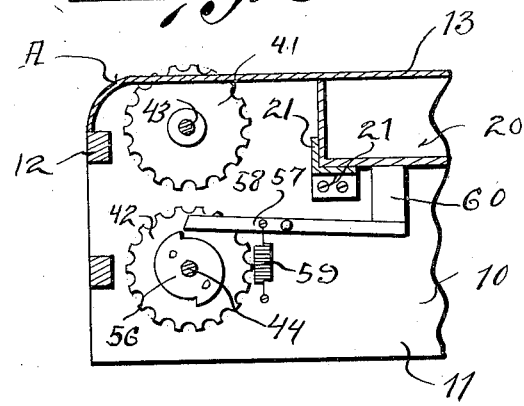
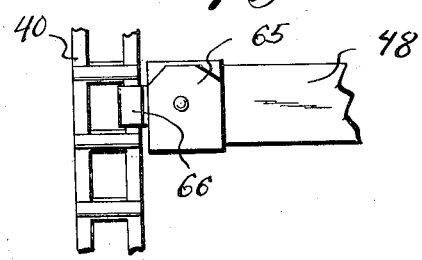
Inventor
N. F. Neuhaus.

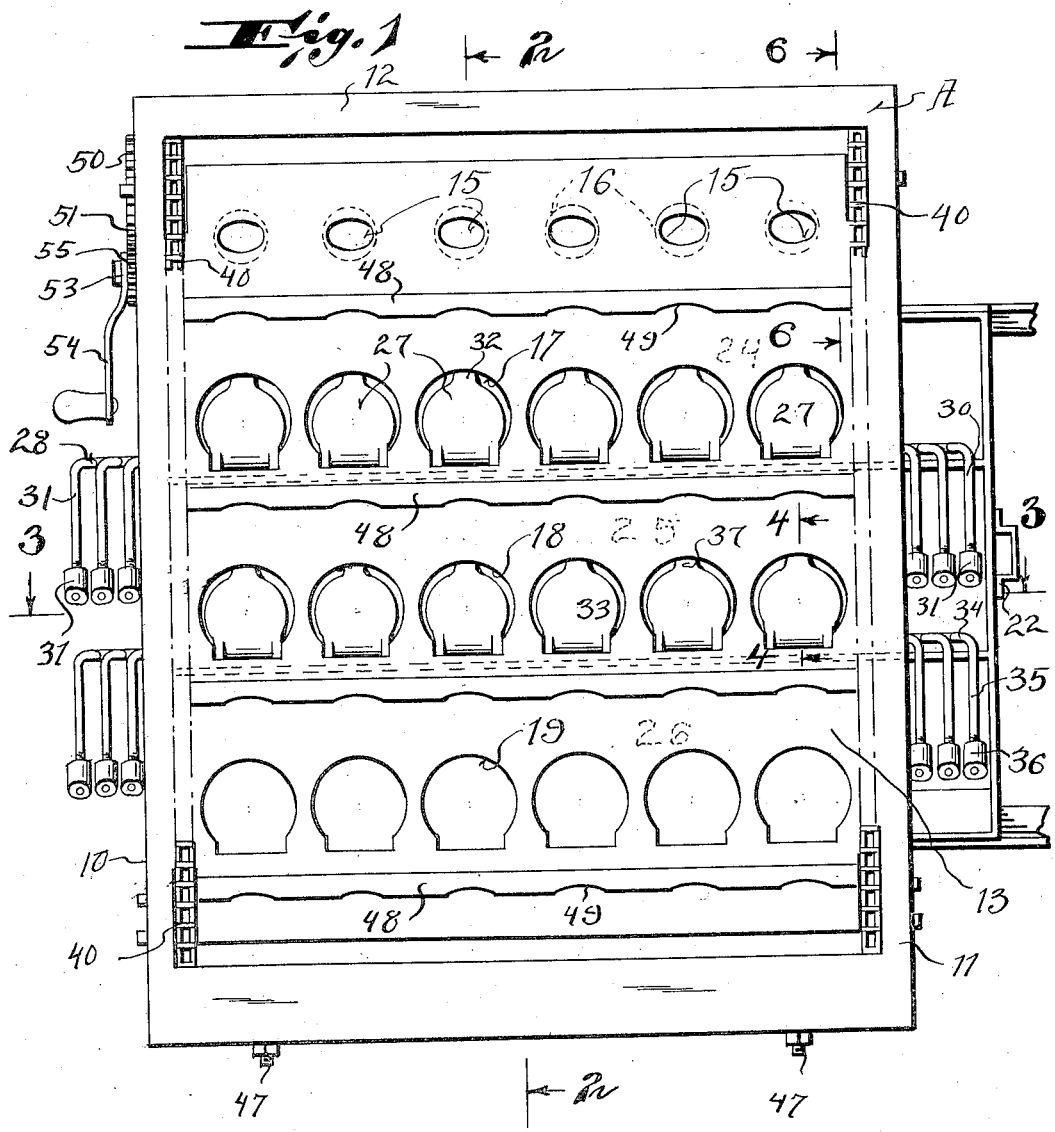

Patented Oct. 8, 1935

2,016,789

UNITED STATES PATENT OFFICE 2,016,789

EGG WEIGHER

William F. Neuhaus, Augusta, Wis.

Application April 18, 1932, Serial No. 605,949
Renewed August 9, 1935

2 Claims. (Cl. 209—121)

This invention appertains to egg weighing machines and has for one of its primary objects the provision of means whereby a maximum number of eggs can be efficiently candled and graded with expenditure of a minimum amount of time and energy.

Another salient object of my invention is the provision of an egg candling and grading machine in which the eggs are initially subjected to the candling operation and then thereafter successively graded as to weight, the different grades of eggs being delivered automatically in different compartments, whereby the same can be readily packed in the desired containers and suitably marked as to quality and size.

In recent years it has become customary to sell eggs according to their size or weight and generally the eggs are classified as to heavy, medium and light eggs. Obviously, the heavy grade of eggs command the best price, the medium weight eggs the next best price, the light weight eggs the least price. Considerable difficulty has been experienced in expeditiously grading the eggs according to their weight.

Therefore my invention relates to a machine in which eggs can be continuously delivered thereto and continuously candled and graded into their different classes without danger of breakage, the machine allowing a large number of eggs to be effectively handled by the use of a single operator.

A further object of my invention is the provision of an egg candling and grading machine embodying a table top over which the eggs are fed continuously by means of an endless conveyor, the table top being provided with the candling openings, whereby the operator can readily observe the same and spaced rows of openings having weighted trap-doors, which are adapted to be lowered by eggs of pre-determined weight, the table having a sliding tray divided into a plurality of different compartments for receiving the different grades of eggs, with means for automatically locking the endless conveyor against movement when the tray is withdrawn from the table, so that the feeding of the eggs over the table inadvertently by the operator will be eliminated.

A still further object of my invention is the provision of a novel egg candling and weighing machine of the above character which will be durable and efficient in use, one that will be simple and easy to manufacture, and one which can be placed upon the market at a reasonable cost.

With these and other objects in view, the invention consists in the novel construction, arrangement and formation of parts, which will be hereinafter more specifically described, claimed, and illustrated in the accompanying drawings in which Figure 1 is a top plan view of my improved egg candling and weighing machine.

Figure 2 is a longitudinal section through the machine taken on the line 2—2 of Figure 1, looking in the direction of the arrows.

Figure 3 is a transverse section through the machine taken on the line 3—3 of Figure 2, looking in the direction of the arrows, the view illustrating the weight-controlled trapdoors.

Figure 4 is an enlarged fragmentary longitudinal section through the table top illustrating one of the weighted trapdoors in detail.

Figure 5 is a side elevation of the machine illustrating the means employed for operating the same.

Figure 6 is a fragmentary longitudinal sectional view illustrating the novel means employed for locking the endless conveyor against movement when the egg carrying tray or drawer is removed from the machine.

Figure 7 is an enlarged fragmentary detailed plan view of the endless conveyor illustrating the means employed for connecting the cross slats or flights to the conveyor chains.

Reference to the drawings in detail, wherein similar reference characters designate corresponding parts throughout the several views, the letter (a) generally illustrates my improved egg candling and weighing machine which comprises a supporting frame 10. The supporting frame 10 may comprise a pair of spaced parallel longitudinally extending side plates 11 connected together at their opposite ends by means of cross braces 12. The side plates 10 have rigidly secured thereto the top plate or table top 13 over which the eggs travel. This top plate or table top 13 can be formed of any preferred material, such as sheet metal of the desired gauge. The frame can be supported in any convenient manner and can either be laid on a support or the same can be provided with supporting standards or legs 14 as shown.

The table top 13 adjacent to its front end is provided with a transverse row of openings 15. These openings are of a relatively small size and of a less size than the eggs so that the eggs will be prevented from falling there-through. Any desired type of light, such as electric lights 16, can be placed under the openings 15 and the operator initially places the eggs over these openings, so as to permit the thorough inspection thereof, in accordance with egg candling methods.

In rear of the egg candling openings 15 the table top 13 is provided with a series of spaced rows of openings 17, 18, and 19. All of these rows of openings 17, 18, and 19 are of a sufficient size to permit the free passage of eggs there-through.

Below the table top 13 I provide a transverse sliding tray 20 for receiving the eggs which may drop through the rows of openings 17, 18, and 19. This tray is slidably supported in suitable guides 21 which can be formed from angle iron if so desired and these guides extend a material distance beyond the one side of the frame, so that the tray can be supported entirely at one side of the frame when the tray is pulled from beneath the table top. A handle 22 is carried by one end wall of the tray to facilitate the operation thereof by the operator. Partitions 23 are arranged within the tray 20 so as to form independent compartments 24, 25, and 26. The compartment 24 normally lies beneath the row of openings 17, the compartment 25 below the row of openings 18, and the compartment 26 below the row of openings 19. As clearly shown in Figure 2 of the drawings, the electric lamps 16 lie in front of the tray 20 and these lamps are entirely independent of the tray. The tray is formed relatively shallow so that the eggs will only fall a short distance, so that any likelihood of the eggs being broken is entirely prevented.

The first rows of openings 17 are normally closed by weighted trap doors or platforms 27. Each of these trap-doors are independently mounted, so that the same can move independently, for the purpose which will be later set forth. Each trap-door 27 is rigidly secured to a transversely extending rod 28 and each rod is rockably mounted in pivot ears 29 arranged on opposite sides of the openings 17. The rods are preferably offset and are extended to the opposite sides of the frame as clearly shown in Figure 3 of the drawings. The outer of the rods are provided with inclined arms 30 and each of the arms is provided with an adjustable weight 31. The weights 31 can be adjusted on their arms in any preferred manner, such as by the use of set screws or as shown, the weights can be threaded on the arms for movement toward and away from the rods.

These weights function to normally hold the trap-doors 27 in a raised position and the forward edges of the trap-doors can be provided with lips 32 for engaging under the table top 13, so that the trap-doors will be prevented from swinging entirely through the openings and above the upper face of the table top. All of the trap-doors will be overcome by eggs of the same weight.

The second rows of openings 18 are normally closed by a similar set of trap-doors 33. Each of these trap-doors 33 is secured to an independent rod 34 and the rods project beyond the opposite sides of the frame and are independently mounted in pivot ears 35' carried by the lower face of the table top 13. The outer ends of the rods 34 are likewise provided with the angularly projecting arms 35 on which are adjustably mounted the weights 36. The arrangement of the weights 36, the arms 35 and the rods 34 are such as to normally hold the trap-doors 33 in a raised position. These trap-doors 33 are also provided with lips 37, so as to prevent the trap-doors from being raised through the row of openings 18.

The weights 36 are of the same mass but of a less size than the weights 31. Thus as the lighter eggs ride over the trap-doors 27 the same will ride onto the trap-doors 33 and eggs of a certain weight will overcome the weights 36 and drop through the openings 18 into the tray.

The row of openings 19 are at all times left open and thus the eggs which ride past the trap-doors 27 and 33 will drop into the tray through the openings 19.

I have provided novel means for continuously feeding rows of eggs over the table top and past the candling openings 15 and the grading openings 17, 18, and 19. This means for feeding the eggs includes an endless conveyor, which may comprise a pair of spaced endless sprocket chains 40. The sprocket chains 40 are trained over top pairs of sprocket wheels 41 arranged adjacent to opposite ends of the frame and over pairs of bottom sprocket wheels 42, likewise arranged adjacent to opposite ends of the frame. The upper sprocket wheels 42 are keyed or otherwise secured to transversely extending shafts 43 rotatably mounted in bearings carried by the side plates 11. The bottom sprocket wheels 42 are keyed or otherwise secured to shafts 44 likewise rotatably mounted in bearings carried by the side plates 11.

If desired, means can be provided for taking up slack in the sprocket chains 40 and this means may consist of arms 45 which rotatably receive one shaft 44 and these arms can be adjusted toward and away from one end of the frame by the use of bolts 46 extending through one of the cross frame bars 12. Nuts 47 can be threaded on the bolts against the frame bar 12 and by adjusting these nuts the mentioned shaft 44 can be moved toward and away from the adjacent end of the frame. The sprocket chains 40 are connected together at spaced points by transversely extending slats or flights 48. These cross slats 48 can be formed of relatively thin material and preferably have the leading edge thereof notched as 49 for engaging the eggs, and these notches 49 are in longitudinal alinement with the various openings of the rows of openings 15, 17, 18, and 19. By the arrangement so far it can be seen that one run of each sprocket chain extends over the table top 13 and that the cross slats 48 travel over the top face of the table top from one end of the same to the other.

Any desired means can be provided for operating the endless conveyor and Figure 5 has illustrated one of the means for actuating the same. This means, as shown, embodies a gear wheel 50 keyed or otherwise secured to one end of the shaft 44 and this gear wheel has meshing therewith an idle gear wheel 51 rotatably mounted on a stub shaft 52 carried by one side plate 11. Rotatably mounted on the frame is an operating shaft 53 having a hand crank 54 to permit the free turning thereof and this shaft 53 has keyed or otherwise secured onto a pinion 55 which meshes with the gear wheel 51. Obviously, by operating the hand crank 54 the handles will be driven through the medium of the meshing gear wheels 51 and 50.

It is extremely desirable to provide means for preventing operation of the conveyor when the tray is removed from under the table top, so that the conveyor cannot be inadvertently operated when the tray is removed which would naturally result in the breaking of the eggs. This means for locking the conveyor against accidental movement may consist of a ratchet wheel 56 keyed or otherwise secured to the cross shaft 44. Rockably interminate its ends at one side of the shaft 44 is an operating lever 57. One end of the lever is provided with a tooth 58 for engaging the periphery of the ratchet wheel and the toothed end of the lever which is normally urged toward the ratchet wheel by the use of a spring 59. The opposite end of the lever projects under the tray 20 and the tray carries a cam 60 for engaging the last mentioned end of the lever. When the tray is in its completely inserted position under the table top, the cam 60 will engage the lever 57 and rock the same against the tension of its spring 59 and move the toothed end thereof out of engagement with the ratchet wheel. This will permit a free movement of the shaft 44. However, when the tray 20 is pulled on its guides 21 from beneath the table top, the cam 60 will be moved from out of engagement with the lever 57 and consequently the spring 59 will draw the toothed end of the lever into engagement with the ratchet wheel and hold the ratchet wheel and shaft 44 against turning movement in the desired direction.

Thus it can be seen that I have provided an exceptionally simple means for automatically locking and releasing the shaft 44 according to the position of the tray 20 relative to the table top 13.

While any desired means can be utilized for connecting the cross slats 48 with the sprocket chains 40 I prefer to provide the ends of the slats with metal cuffs 65. These cuffs 65 protect the slats against breakage and the same can be provided with bendable lips 66 for engaging about the links of the sprocket chains. This provides an easy means for assembling the slats on the sprocket chains and allows the convenient replacing of the slats in case of breakage thereof.

In operation of my improved device the operator stands at the forward end of the machine with one hand on the crank 54, the eggs are placed with the other hand over the openings 15 and the operator can readily view the eggs through the medium of the lights 16 to determine whether or not the same are fertile or contain blood spots or the like. When a row of eggs has been placed in position, the crank can be rotated and a cross slat will engage the eggs and move the same over the table top. A second row of eggs can be immediately placed in position over the openings 15. As the eggs pass over the rows of openings 17, 18, and 19 the heaviest eggs will overcome the weight of the trap-doors 27 and will drop through the openings 17. The lighter eggs will ride over the trap-doors 27 on to the trap-doors 33 and eggs of a certain weight will overcome these trap-doors and fall through the openings 18. The remaining eggs will fall through the openings 19. The grading of the eggs by weight is entirely automatic and needs no attention by the operator. Thus the operator's full attention can be devoted to the candling of the eggs. Obviously, the different grades of eggs drop into the different compartments 24, 25, and 26 of the tray 20 and when the tray becomes filled with the eggs, the same can be removed. As stated, as soon as the tray is removed, the conveyor is locked against further movement.

From the foregoing description, it can be seen that I have provided an improved egg candling and grading machine which is of an exceptionally simple and durable character which will permit a maximum number of eggs to be candled in a minimum amount of time with the employance of a single operator.

Changes in detail may be made without departing from the spirit or scope of the invention, but what I claim as new is:

1. A machine for grading eggs according to weight comprising a table top having a series of spaced rows of grading openings, means for controlling the passage of eggs through certain of said rows of openings in direct accordance to their weight, a removable tray for receiving the graded eggs from the rows of openings having a plurality of independent compartments, means including an endless conveyor for carrying the eggs over the table top, and means for locking the conveyor automatically against movement when the tray is removed from under the table top.

2. A machine for grading eggs according to weight comprising a table top having a series of spaced rows of grading openings, means for controlling the passage of eggs through certain of said rows of openings in direct accordance to their weight, a removable tray for receiving the graded eggs from the rows of openings having a plurality of independent compartments, means including an endless conveyor for carrying the eggs over the table top, and means for locking the conveyor automatically against movement when the tray is removed from under the table top, said means embodying a ratchet wheel and pivot dog, means normally urging the dog toward the ratchet wheel, and a cam carried by the tray and engaging said dog to hold the same above the ratchet wheel against the tension of its spring.

WILLIAM F. NEUHAUS.